United States Patent [19]

Price et al.

[11] Patent Number: 4,849,120
[45] Date of Patent: Jul. 18, 1989

[54] MAGNETICALLY CONTROLLABLE COUPLINGS CONTAINING FERRAFLUIDS

[76] Inventors: John T. Price, 17 High Field Ln., Madison, Conn. 06443; Jurgen M. Kruse, 129 Florence Rd., Branford, Conn. 06405

[21] Appl. No.: 188,694

[22] Filed: May 2, 1988

Related U.S. Application Data

[63] Continuation of Ser. No. 862,765, May 13, 1986, abandoned.

[51] Int. Cl.$^4$ .................... C04B 35/00; F16D 27/00
[52] U.S. Cl. .................... 252/62.52; 252/62.56; 192/21.5
[58] Field of Search .................... 252/62.52, 62.56; 192/21.5

[56] References Cited

U.S. PATENT DOCUMENTS

| | | | |
|---|---|---|---|
| 2,736,409 | 2/1956 | Logan | 252/62.52 |
| 2,751,352 | 6/1956 | Bond | 252/62.52 |
| 2,900,343 | 8/1959 | Barnes | 252/62.52 |
| 3,764,540 | 10/1973 | Khalafalla et al. | 252/62.52 |
| 3,917,538 | 11/1975 | Rosenswerg | 252/62.52 |
| 4,178,171 | 12/1979 | Steck et al. | 252/62.56 |
| 4,430,239 | 2/1984 | Wyman | 252/62.52 |
| 4,508,625 | 4/1985 | Graham | 210/695 |
| 4,701,276 | 10/1987 | Wyman | 252/62.52 |
| 4,741,850 | 5/1988 | Wyman | 252/62.52 |

*Primary Examiner*—John F. Niebling
*Assistant Examiner*—Steven P. Marquis
*Attorney, Agent, or Firm*—Hamilton, Brook, Smith & Reynolds

[57] ABSTRACT

This invention disclosed a new ferrofluid and the use of ferrofluids in magnetically controllable couplings such as electromagnetic clutches and brakes. The new ferrofluid is comprised of a stable suspension of magnetizable particles having a size of at least one micron, a fluid carrier and a complexing agent. The complexing agent maintains the magnetizable particles in suspension within the carrier fluid.

15 Claims, 1 Drawing Sheet

MAGNETICALLY CONTROLLABLE COUPLINGS CONTAINING FERRAFLUIDS

This is a continuation of co-pending application Ser. No. 862,765 filed on May 13, 1986 now abandoned.

BACKGROUND OF THE INVENTION

Magnetically controllable couplings such as magnetic clutches and brakes are well-known in the art. In these devices, the movement of one member is controlled by a second member by means of a magnetic flux which flows from one of the members to the other. Examples of such devices are magnetic clutches and brakes.

FIGS. 1 and 2 illustrate examples of electromagnetic clutches. The clutches are comprised of two rotating elements, an electromagnetic coil, and a magnetizable medium, such as iron particles in gas or in a liquid. One of the rotating elements, the driving member, is rotated by an outside power source. In close proximity thereto is a driven rotating member. In between the driving member and the driven rotating member is a gap in which the magnetizable medium is located. The electromagnetic coil surrounds the driving rotating element.

The physical shape of the hardware of a magnetic clutch or brake is influenced by the magnetic coil and the magnetic flux it generates. This flux forms a three-dimensional shape. This shape forms as if it were following a cylinder open at both ends, the flux lines running in a closed loop. The flux lines can be thought of as starting at one end of the cylinder on the inside, passing down its length, rolling toward the outside, returning back up the outside, and finally turning back inside to return to the starting point. The magnetic coil usually defines an imaginary cylinder diameter since metal must pass inside it to be magnetized. Since air is nonmagnetic, a magnetizable medium, i.e. one that is magnetically conductive, must be used to provide a path for the magnetic flux. Somewhere within this flux loop are the driving member, the driven member, and the medium containing magnetizable particles which serve as part of the flux loop. Normally these are located on the inside portion of the magnetic cylinder. As the electromagnetic coil is energized, it forms a magnetic flux from the driving member through the fluid in the gap and to the driven member. The driven member follows the rotation of the driving rotating member.

The closeness with which the driven member follows the movement of the driving member depends primarily on two factors. One factor is the strength of the magnetic field through the two rotating elements and the magnetic medium. As the strength of the magnetic field increases there is less slippage (difference in revolutions per minute between driver and driven elements). The upper limit of the magnetic force is achieved when the coil ceases to increase in magnetic strength or when the components of the clutch can handle no more magnetic flux, i.e. saturation occurs.

The other factor which determines how close the driven member follows the driving element is the amount of resistance to rotation applied to the driven element. Assuming no load or resistant on the driven member, it will follow the driving member in speed revolutions per minute (RPMs). If this exceeds the power of the magnetic field, there will be no rotation. In between these extremes is the situation where some load exists, but it may be overcome with sufficient magnetic field strength. By changing the coil current to the clutch, its magnetic field strength changes. This in turn causes a direct change in speed to the driven element. Since the driving element is running at a fixed speed, the result is a clutch with infinitely variable output which can be changed as quickly as the electrical power to the coil can be changed. Thus, the clutch is able to rapidly change speed with the new speed being controllable. In other words, the speed of the driven element (output) is proportional to coil electrical input.

The clutch designs shown in FIGS. 1 and 2 can be modified to form brakes if the driven member in each embodiment is securely fastened so that it cannot rotate. Thus, when the electromagnetic flux engages the rotating member and the fixed nonrotating member, the rotating member will stop rotating.

The magnetically controllable couplings of the prior art have had to contend with major limitations. These limitations are deficiencies present in the magnetizable medium which has been used in these couplings.

The magnetizable media of the prior art has been comprised of magnetic particles in gas (predominately air) and magnetic particles in a liquid. In magnetic clutches and brakes centrifugal force often causes the iron particles to be impelled toward the periphery of the clutch chamber, and to become packed due to the large radial head of the iron particles. Iron particles (magnetic powder) in air have problems with heat dissipation since air is thermally nonconductive. This causes a heat buildup which in turn causes sintering of the particles. Eventually the particles are completely oxidized to $Fe_2O_3$ which is considered to be nonmagnetic. Magnetic particles in a fluid do not remain in suspension when the magnetic field is not engaged. Therefore a time lag occurs between the time the electromagnet is energized and the coupling is fully operational.

SUMMARY OF THE INVENTION

Magnetically controllable couplings which contain ferrofluids instead of the magnetic media of the prior art are herein disclosed. A ferrofluid is a stable suspension of magnetizable particles in a carrier fluid. The suspension or colloidal dispersion does not settle out under the influence of gravity, a magnetic field or centrifugal force. Ferrofluids have in the past been used to create seals but such ferrofluids have not been used for mechanical drive. The magnetizable particles in the ferrofluid of the prior art have ranged in size from 10 to 800 Angstroms and more particularly from 50 to 500 Angstroms.

The particles are dispersed and maintained in suspension by complexing agents. These complexing agents, also known in the literature as surfactants or dispersing agents, are necessary to keep the magnetizable particles from settling. To do this, the particles must be prevented from agglomerating by being encapsulated within a plurality of molecules of the complexing agent which bind to the magnetizable particle. One portion of a molecule of the complexing agent will bind to the surface of the magnetizable particles. The remainder of the molecule of the complexing agent will then "stick" out from the magnetizable particle and will be solvated to solvent (carrier fluid) molecules. Thus, the iron will be surrounded by a sphere of solvent molecules attached to molecules of the complexing agent forming solvated spheres.

Because the complexed magnetizable particles will have a surface charge, the solvated spheres will have a tendency to repel each other. Thus, both of these factors, i.e. the fact that the magnetizable particles are solvated and that the solvated spheres possess like charges, prevents the particles from agglomerating.

Ferrofluid compositions are widely known, and typical ferrofluid compositions are described more particularly in U.S. Pat. No. 4,430,239 issued Feb. 7, 1984, U.S. Pat. No. 3,700,595, issued Oct. 24, 1972, and U.S. Pat. No. 3,764,540, issued Oct. 9, 1973. A particular process for preparing such ferrofluid composition is described in U.S. Pat. No. 3,917,538 issued Nov. 4, 1975. This patent describes a grinding or ball-mill technique for preparing ferrofluid compositions. U.S. Pat. No. 4,019,994, issued Apr. 26, 1977, describes a precipitation technique for preparing ferrofluid compositions. The teachings of the above-referenced patents are hereby incorporated by reference.

A preferred ferrofluid composition is prepared by suspending particles with high magnetic susceptibility or permanently magnetized in an inert fluid medium. The particles can be iron, stainless steel, nickel-iron alloy or any similar magnetizable material. If a permanent magnet is used the material may be Alnico or similar composition. The preferred particle size for application in a magnetic clutch or brake should be in the 100 to 400 mesh range (Tyler Sieve) (35 micrometers to 150 micrometers), with the preferred range being 200 to 325 mesh (40-75 micrometers). To suspend these particles a constant viscosity fluid, such as a non-polar organic hydrocarbon oil is employed. The metal particles are suspended in the oil by milling the oil, a complexing agent such as disodium ethylene diamine tetraacetic acid, a dialkyl acid pyrophosphate or a fatty acid diamine and the magnetizable particles together for periods of from 10-200 hours. For most suspensions, a milling time of from 30-70 hours appears optimum.

The above-described preferred ferrofluid composition is more desirable for use in a magnetically controllable coupling than the ferrofluids of the prior art because of the size and composition of the particles used. The magnetizable particles in the preferred ferrofluid composition are metallic and much larger than those previously used in ferrofluid compositions. Previous ferrofluid compositions employed oxide metal particles ranging in size from 10 to 800 Angstroms. However, the preferred ferrofluid composition of this invention employs metallic particles ranging in size from 35-150 micrometers or 350,000-1,500,000 Angstroms. The use of these larger-sized metal particles provides for a ferrofluid with a greater density of magnetizable particles within the ferrofluid. This produces a ferrofluid having a greater ability to conduct a magnetic flux.

In addition, metallic particles have a much higher saturation flux density. Typically pure iron, nickel-iron, cobalt-iron, etc, have a maximum saturation of 12,000 to 22,000 gauss. This compares favorably to the value of less than 1000 for magnetite, hematite, and other ferrous compounds previously used in ferrofluids. Finally the concentration of magnetic material in the ferrofluid is a contributing factor in torque transfer. This is measured by density or specific gravity of the fluid. Previous ferrofluids have had a specific gravity in the range of 1.0-1.6. The preferred ferrofluid of this invention has a specific gravity in the range of 3.0-3.3.

DETAILED DESCRIPTION OF THE INVENTION

Magnetically controllable couplings which contain ferrofluids are disclosed. These couplings are typically electromagnetic clutches and brakes as illustrated in FIGS. 1 and 2.

Figure 1:
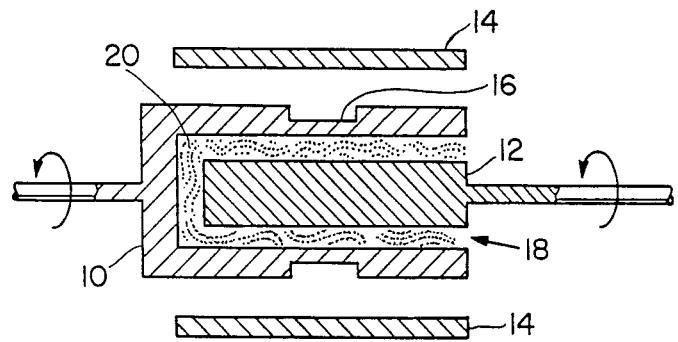
FIG. 1 shows an embodiment of a magnetically controllable coupling.

FIG. 1 illustrates a magnetically controllable coupling in which ferrofluids can be used. In this embodiment of a clutch, a driven cylinder 12 is contained within a driving cylinder 10. Surrounding the outer driving cylinder 10 is an electromagnet 14. Between outer cylinder 10 and inner cylinder 12 is gap 18. Gap 18 can be filled with ferrofluid 20. As electromagnet 14 is turned on, a magnetic field is created such that magnetic flux lines pass from larger diameter cylinder 10 to smaller diameter cylinder 12. To shorten the flux path it is normal to have the flux path returned back through larger cylinder 10. In order to prevent the flux from by-passing the inside cylinder by following a straight line through the outer cylinder, a step 16 is cut into outer cylinder 10 at its mid point. This reduces the flux outer cylinder 10 will pass, forcing the flux to step off onto smaller diameter cylinder 12. Ferrofluid 20 conducts the magnetic flux from outer cylinder 10 to inner cylinder 12 and back to outer cylinder 10.

Figure 3:
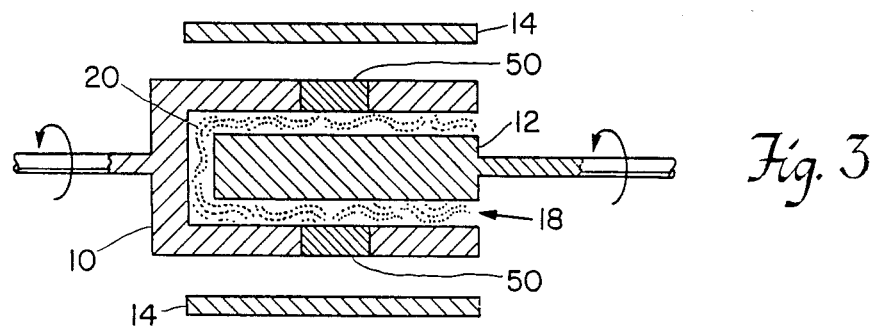
FIG. 3 shows a preferred embodiment of the coupling shown in FIG. 1.

FIG. 3 shows a preferred embodiment of the clutch model shown in FIG. 1 in which a nonmagnetic ring 50, such as an aluminum ring, is inserted at the midpoint of the larger diameter cylinder 10 replacing step 16 of the clutch shown in FIG. 1. This prevents any of the magnetic flux from bypassing inner cylinder 12.

Figure 2:
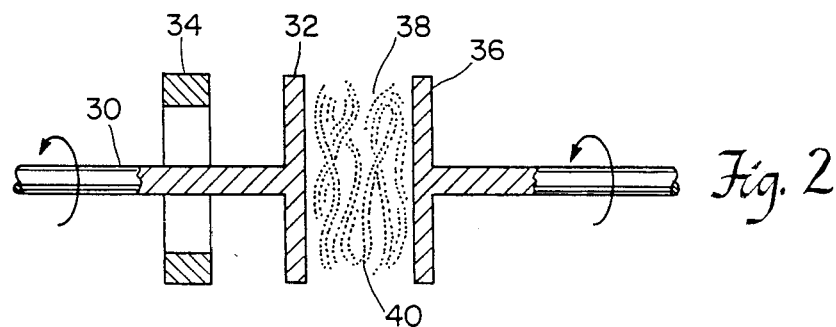
FIG. 2 shows another embodiment of a magnetically controllable coupling.

FIG. 2 illustrates an alternative coupling to that illustrated in FIG. 1. In this embodiment two discs face each other with ferrofluid in between. Shaft 30 attached to disc 32 is surrounded by the electromagnetic coil 34 such that when the electromagnetic coil is turned on, the magnetic flux travels in a straight line from the driving disc 32 to driven disc 36. Between the two discs is gap 38 containing ferrofluid 40 of the present invention.

Between the driving and driven member is placed a ferrofluid to conduct the magnetic flux from the driving to the driven member. A ferrofluid is a stable suspension of magnetizable particles in a carrier fluid. The magnetizable particles are held in suspension in the carrier fluid by means of a complexing agent. The suspension or colloidal dispersion of magnetizable particles does not settle out under the influence of gravity, of a magnetic field, or under the influence of a centrifugal force. The size of the magnetizable particles of the ferrofluids of the prior art range in size from 10 to 800 Angstroms and usually within the range of 50 to 500 Angstroms.

Many different carrier fluids have been used. Carrier fluids have been both polar and non-polar. Examples of polar carriers are organic liquids useful as plasticizers for polymers, such as vinyl-chloride resins, and liquid carriers which include diesters, triesters and polyesters of saturated hydrocarbon acids such as $C_6$-$C_{12}$ acids; phthalates, such as dioctyl and dialkyl phthalates and trimellitate esters, citrate esters and particularly diesters and triesters. Other polar carrier fluids include derivatives of phthalic acid, epoxy derivatives, polyesters of glycol, phthalic acids with various glycols, trimellitates, glycol dibenzoates, pentaerythritol derivatives, and chlorinated liquid paraffin.

Among the non-polar liquid carriers are aliphatic hydrocarbon fluids, such as kerosene, heptane and hydrocarbon oils.

Among the complexing agents, also known as surfactants or dispersing agents in the prior art, are phosphated alcohol esters, aliphatic monocarboxylic acids, succinates, sulfonates, phosphated alcohols, amine long-chain acid reaction products and polyether alcohols such as alkylphenoxy polyethoxyethanols.

In a preferred ferrofluid for use in an electromagnetically controllable coupling, the size of the magnetizable particles range from 350,000–1,500,000 Angstroms (Tyler Mesh +400 to −100) and the carrier is a hydrocarbon oil. In this preferred embodiment, the complexing agent can be disodium ethylene diamine tetraacetic acid (EDTA), a dialkylacid pyrophosphate, a fatty acid diamine or a mixture thereof. The complexing agent EDTA is known in the art as a chelating agent, i.e. it is known to form a multiple coordinate bond with a metal ion. Thus EDTA forms a multiple coordinate bond with the magnetizable particles suspended within the carrier fluid.

The function of the complexing agent is to keep the magnetizable particle from settling. The magnetizable particles are each surrounded by and bonded to a plurality of molecules of the complexing agent. One portion of a molecule of the complexing agent forms a bond with the surface of the magnetizable particle, the remainder of the complexing agent molecule will then stick out from the particle and will bind and be solvated to molecules of the carrier fluid solvent. Thus, a magnetizable particle will be surrounded by a sphere of solvent molecules attached to molecules of the complexing agent forming a solvated sphere. Because the complexed magnetizable particles have a surface charge, the solvated spheres will have a tendency to repel each other. Both of these factors, i.e. the fact that the magnetizable particles are encapsulated in a solvation sphere and that they repel each other, keeps them from agglomerating and maintains them in suspension.

In the preferred embodiment, the ferrofluid is prepared by suspending the magnetizable particles in an inert fluid medium. The particles can be made of metallic iron, stainless steel or a nickel-iron alloy. If a permanent magnet is used the material may be alnico (an alloy comprised of about 50% iron and varying percentages of aluminum, nickel and cobalt) or a similar composition. The size of the particles range in size from 350,000 Angstroms to 1,500,000 Angstroms with the preferred range being between 40,000 and 750,000 Angstroms (Tyler Mesh +325 to −200). The maximum magnetic strength of the material is also a factor in the design. Specifically, metallic elements having a high magnetic saturation which usually have a high purity are chosen. These include iron, nickel, and cobalt plus those stainless steel and alnico. Also included is highly pure iron (99.96+) $Fe(H_2)$ which has been annealed in hydrogen. The metals cited above have a magnetic saturation of 12–22 kilogauss with the preferred value being as high as possible. The preferred ferrofluid is designed to conduct the maximum magnetic flux possible. This is done by using magnetizable particles having the largest size possible, greatest saturation value and greatest concentration (i.e. specific gravity).

The metal particles are suspended in a carrier fluid by milling the carrier fluid, complexing agents and the metal particles for periods of from 10–200 hours. For most suspensions, a milling time of from 30–70 hours is optimal. The conditions in the ball mill are set so that minimum grinding of the metallic particles occurs, but the mixture is thoroughly mixed. The milling time greatly influences the degree of suspension. A short milling time, such as 30 hours, followed by a 48 hour settling time where the solution is placed on a magnet to separate the solvated metallic particles from any excess solvent. The excess solvent forms as an upper layer and is decanted off and discarded. The remaining solution is a concentrated form of a ferrofluid being comprised of solvated spheres and possessing like charges to repel each other, i.e. the spheres are non-agglomerating. This fluid flux has both a high specific gravity such as 3.0 and high magnetic flux transmission capability (due to the concentration of the magnetic medium).

If the milling operation is permitted to continue for a long time such as 100 hours the process goes to completion. In this case the oil surrounding each sphere is increased. The result is a solution which will have little or no decant. This solution would have a low specific gravity such as 1.3. Also this solution is weaker in magnetic flux transmission because of the dilution of the magnetic media. A solution of this type would be used where no torque transfer is desired such as used in bearings, exclusion seals and inertia dampening devices as noted in prior art. Other complexing agents can be used in addition to the materials listed above.

The ferrofluids of the present invention are further illustrated by the following examples. The torque value in foot-pounds was determined by using model G10 clutch manufactured by W.J. Industries, Fenton, Mo. 63026. This unit normally is supplied with magnetic powder. It has a rated value of 10 foot-pounds. The configuration of this unit is that shown as FIG. #1.

EXAMPLE 1

Materials 150 grams of #420 stainless steel particles
10 grams $NA_2EDTA$
20 grams tri-butylphosphate
150 ml Mobile 1 Oil TM (Mobile 1 Oil TM is a 100% synthetic motor oil manufactured by the Mobile Oil Corporation of New York, N.Y.)

Procedure 150 grams of #420 stainless steel particles were milled with 10 grams of $NA_2EDTA$, 20 grams of tri-butylphosphate and 150 ml of Mobile 1 oil for a period of 100 hours and the excess oil decanted off. The maximum torque obtained was 14.9 foot-pounds.

EXAMPLE 2

Materials 150 grams #420 stainless steel
5 grams $NA_2EDTA$
20 grams tri-butylphosphate
150 ml Mobile 1 Oil TM Procedure 150 grams of #420 stainless steel, 150 ml Mobile 1 Oil TM, 5 grams $NA_2EDTA$ and 20 grams tri-butylphosphate were ball-milled together for 100 hours and the excess oil decanted off. The stainless steel conformed to ANSI standards with 12–14% chrome and the balance iron. Maximum torque obtained was 15.0 foot-pounds.

EXAMPLE 3

Materials 150 grams of iron-nickel alloy powder (42% Ni–58% Fe)
15 grams NA$_2$EDTA
30 grams Kemamine 650 TM (Kemamine 650 TM is an ethoxylated diamine produced by the Humko Chemical Co. of Memphis, Tenn.)
175 ml Mobile 1 Oil TM Procedure 150 grams of 200 mesh iron-nickel powder, were ball milled with 15 grams of NA$_2$EDTA and 30 grams Kemamine 650 TM for 100 hours in 175 ml of Mobil 1 Oil TM and the excess oil decanted off. The resultant suspension was tested in the clutch of FIG. 2. The maximum torque obtained was 11.6 foot-pounds.

EXAMPLE 4

Materials 150 grams iron powder
10 grams NA$_2$EDTA
30 grams Kemamine 650 TM
100 ml Mobile 1 Oil TM Procedure 150 grams of 200 mesh iron powder were ball milled with 10 grams of Na$_2$EDTA and 30 grams of Kemamine 650 TM for 100 hours in 100 ml of Mobile 1 Oil TM and the excess oil decanted off. The maximum torque obtained was 14.5 foot-pounds. (Kemamine 650 TM is an ethoxylated 1,3 propylene diamine manufactured by the Humko Chemical Co., Memphis, Tenn.)

EXAMPLE 5

Materials 150 grams Fe(H$_2$)
10 grams Na$_2$EDTA
30 grams tri-butylphosphate
100 ml Mobil 1 Oil TM Procedure 150 grams Fe(H$_2$), 100 ml Mobil 1 Oil TM, 10 ml Na$_2$EDTA, and 30 grams tri-butylphosphate were ball milled together for 30 hours and the excess oil decanted off. The maximum torque obtained was 15 foot-pounds.

EXAMPLE 6

Materials 300 grams Fe(H$_2$)
20 grams Na$_2$EDTA
60 grams tri-butylphosphate
250 ml Mobile 1 Oil TM Procedure 300 grams Fe(H$_2$), 250 ml Mobile 1 Oil TM, 20 grams Na$_2$EDTA, and 60 grams tri-butylphosphate were ball milled together for 50 hours and the excess oil decanted off. The maximum torque obtained was 16 foot-pounds.

EXAMPLE 7

Materials 200 grams Fe
35 grams Kemamine 650 TM
20 grams Na$_2$EDTA
350 ml Mobile 1 Oil TM Procedure 200 grams Fe, 350 ml Mobil 1 Oil TM, 35 grams of Kemamine 650 TM, 20 grams Na$_2$EDTA were ball-milled together for 100 hours forming a homogeneous suspension. The iron particles were 99%+ pure (but not H$_2$ annealed). The maximum torque obtained was 1.4 lb-ft.

EXAMPLE 8

Materials 150 grams Fe(H$_2$)
20 grams Na$_2$EDTA
60 grams tri-butylphosphate
250 ml 10W-40 Motor Oil Procedure 150 grams of Fe(H$_2$), 250 ml of 10W-40 Motor Oil, 20 grams of Na$_2$EDTA and 60 grams of tri-butylphosphate were ball-milled together for 50 hours and the excess oil was decanted off. The maximum torque obtained was 10.75 foot-pounds.

Examples 6 and 7 demonstrate effects of different chemicals and milling times. Example 6 used a short milling time with tri-butylphosphate. This solution had a decant of 241 ml (69% of oil) with the resultant having a specific gravity of 3.553 which gave a high torque. Example 7 used a long milling time and Kemamine 650 TM. Initally this had no iron free liquid to decant. After three months the decant was only 51 ml (15% of oil). The specific gravity of the fluid was 1.244 with a very low torque.

EXAMPLE 9

Materials 150 grams Fe(H$_2$)
250 ml 10W-40 Motor Oil
20 grams Na$_2$EDTA
60 grams tri-butylphosphate Procedure The above listed ingredients were ball-milled together for 50 hours and the excess oil decanted off. The maximum torque obtained was 10.75 foot-pounds.

Equivalents

Those skilled in the art will recognize or be able to ascertain, using no more than routine experimentation, many equivalents to the specific embodiments described herein. Such equivalents are intended to be covered by the following claims.

What is claimed is:

1. In a magnetically controllable coupling containing a magnetic member, coupling members and a magnetic fluid which is in fluid communication with said coupling members, wherein the coupling members are maintained in position relative to each other by magnetic flux flowing from the magnetic member to one coupling member through the magnetic fluid to another coupling member, the improvement comprising:

a magnetic field applied across the magnetic fluid between the coupling members;
a magnetic fluid for transmitting torque between said coupling members comprised of a stable suspension of magnetizable particles, and a chelating agent bonded to the particles such that said agent maintains the magnetizable particles in suspension within a carrier fluid.

2. An improvement as recited in claim 1, wherein the magnetic member is an electromagnet.

3. An improvement as recited in claim 1, wherein the coupling members are comprised of a driving member and a driven member to form a magnetically controllable clutch.

4. An improvement as recited in claim 1, wherein the coupling members are comprised of a driving member and a fixed member to form a magnetically controllable brake.

5. An improvement as recited in claim 1, wherein the magnetizable particles within the ferrofluid are at least one micron in size.

6. An improvement as recited in claim 1, wherein the magnetizable particles are metallic.

7. An improvement as recited in claim 1, wherein the magnetizable particles range in size from about 35 to 150 microns.

8. An improvement as recited in claim 1, wherein the magnetizable particles range in size from about 40 to 75 microns.

9. An improvement as recited in claim 1, wherein the chelating agent is selected from the group consisting of disodium ethylene diamine tetraacetic acid, tri-butylphosphate, ethoxylated amines, pyrophosphates, and fatty acid diamines.

10. In a electromagnetically controllable coupling containing an electromagnetic member, coupling members and a magnetic fluid which is in fluid communication with said coupling members, wherein the coupling members are maintained in position relative to each other by a magnetic flux flowing from the electromagnetic member to one coupling member through the magnetic fluid to another coupling member, the improvement comprising:

a magnetic field applied across the magnetic fluid between the coupling members; and a magnetic fluid for transmitting torque between said coupling members that is comprised of a stable suspension of magnetizable particles, said particles ranging in size from about 35-150 microns, a chelating agent, and a hydrocarbon oil as a carrier fluid such that the complexing agent is bonded to and encapsulates the magnetizable particles thereby maintaining said particles in suspension within the carrier fluid.

11. An improvement as recited in claim 10, wherein the magnetizable particles are metallic.

12. An improvement as recited in claim 10, wherein the magnetizable particles range in size from about 40 to 75 microns.

13. An improvement as recited in claim 10, wherein the chelating agent is a member selected from the group consisting of disodium ethylene diamine tetraactic acid, tri-butylphosphate, ethoxylated amines, pyrophosphates and fatty acid diamines.

14. An improvement as recited in claim 10, wherein the coupling is a clutch.

15. An improvement as recited in claim 10, wherein the coupling is a brake.

* * * * *